United States Patent Office 2,955,981

Patented Oct. 11, 1960

1

2,955,981

PREVENTION OF IRON-DEFICIENCY ANEMIAS IN SUCKLING MAMMALS

Wayne Henry Linkenheimer, New City, N.Y., assignor to American Cyanamid Company, New York, N.Y., a corporation of Maine No Drawing. Filed Dec. 31, 1957, Ser. No. 706,237

10 Claims. (Cl. 167—53)

This invention relates to the prevention of anemia of the iron-deficiency type in suckling mammals. More particularly, the invention relates to a method of increasing the iron content of the milk of lactating mammals whereby an iron-enriched milk is made available.

It has been recognized for a long time that milk is deficient in iron; and when the diet is composed almost exclusively of milk and milk products, anemia of the iron-deficiency type often results. This is particularly true in the case of suckling mammals, who for the first stages of their lives live almost exclusively on milk. These young mammals, which term includes human infants, grow rapidly; and they require more iron for their red blood cells than can be furnished by their consumption of normal milk. As a result, many develop anemia and may sicken and die. Iron-deficiency anemias are especially troublesome in animal husbandry. Baby pigs, for instance, are quite prone to develop iron-deficiency anemias; and considerable losses are suffered as a result.

It is not usually convenient to administer iron to these suckling mammals. Most of them feed exclusively on their mothers' milk for the first few weeks of their lives, and it is during this period that the iron-deficiency anemia is apt to develop. Injection of the sucklings with hematinic compounds is troublesome and often unsatisfactory. When the lactating mother is given iron compounds in her feed, it is found that the iron is broken down in the digestive system and bound to transferrin, the binding globulin of the blood plasma, and is deposited in the liver. Similarly, if the lactating mother is injected with conventional hematinic iron compounds, they, too, are largely bound with plasma globulins and stored in the mother's liver.

I have discovered that certain iron salts, for instance, the ferrous salt of ethylenediamine tetraacetic acid and the ferric salt of ethylenediamine tetraacetic acid have unique properties which make it possible to inject these iron compounds into a lactating mammal and that an effective amount of the iron is eliminated from the animal's system into the milk and is thus made available to sucklings.

This unique property of the iron salts of ethylenediamine tetraacetic acid is believed to be due to the unusually strong iron-binding (chelating or sequestering) capacity of ethylenediamine tetraacetic acid. While the iron-binding globulin or transferrin has strong iron-binding properties and takes iron from other compounds which may be in the blood stream, the iron-binding capacity of ethylenediamine tetraacetic acid appears to be greater than that of the transferrin and thus prevents the iron from being taken out of the blood stream. As a result, the iron is excreted either in the urine or in the mother's milk. That which is excreted in the milk thus becomes available to the suckling during its early stages of growth and serves to prevent the development of iron-deficiency anemias.

2

Both the ferrous and ferric salts of the ethylenediamine tetraacetic acid, hereinafter referred to as EDTA, are operative in practicing the present invention; and any other iron-chelating or sequestering agent which has a greater iron-binding power than that of the natural iron-binding globulins of the blood could, likewise, be used.

The iron salts of EDTA are not effective in increasing the iron content of milk when administered orally. This is probably due to decomposition of these salts in the digestive system prior to absorption into the blood stream.

In practicing the process of the present invention, one of the iron salts of EDTA is injected in suitable amounts, concentrations and time intervals depending upon the animal involved and the results desired. In the case of sows, for example, two injections of 10 cubic centimeters of a 10 percent solution at intervals of about three and ten days post-partum is sufficient to prevent development of iron-deficiency anemias in the suckling piglets. Baby pigs commence to eat their mother's food and thus obtain more abundant amounts of iron at periods of from fifteen to twenty days after birth. In the case of other mammals which drink milk as their principal item of sustenance for longer periods of time, more injections of the iron salt of EDTA, usually about seven to ten days apart, might be desirable.

Preferably the injection of the iron salt is by the intramuscular route, although other parenteral routes of administration such as subcutaneous, intraperitoneal, intravenously, and the like can be utilized providing due care is taken. The solution that is injected may contain from about 1 to 20 percent by weight of the iron salt of EDTA. The dosage may vary considerably from 1 to 200 milligrams of the iron salt per kilogram of body weight. Ordinarily, 5 to 10 milligrams per kilogram of the salt is enough. Although EDTA is reported to be toxic to rats at 100 milligrams per kilogram of body weight, yet this toxicity is due to a single injection of the free acid and does not apply to slow injections of the iron salt.

To illustrate the novel effects of the iron salts of EDTA, groups of mother rats weighing an average of about 200 grams per rat were injected with 8 milligrams of iron as ferrous sulfate on four different occasions at three-day intervals. Another group of sixteen rats were similarly injected intramuscularly with 8 milligrams of iron in the form of an aqueous solution of monosodium ferric ethylenediamine tetraacetate. All of these injected rats had sucklings. At the end of the experimental period, blood samples from the infant rats were obtained and examined. The hematocrit percent—that is, the volume of packed red cells of the infant rats which had fed on the milk of their mothers who had been given iron as ferrous sulfate—averaged 18.8 percent, whereas those who suckled mothers injected with ferric ethylenediamine tetraacetate averaged 25.5 percent, thus showing that these latter infant rats were obtaining more iron from their mothers' milk than the ferrous sulfate treated ones.

In another experiment, the milk of a lactating cow was examined on three consecutive milkings and analyzed for iron content. The cow was then injected subcutaneously with an aqueous solution containing 40 milligrams of iron in the form of monosodium ferric ethylenediamine tetraacetate. The injection was given in the afternoon; and the milk that was drawn at the subsequent morning milking was examined for iron content. That afternoon, the cow was again injected with 40 milligrams of iron and the milk examined the next day as before. The injection was again repeated with the results shown in the following table:

TABLE I

| Collection No.: | Fe in milk |
|---|---|
| 1 | γ/l.. 700 |
| 2 | γ/l.. 600 |
| 3 | γ/l.. 800 |
| 40 milligrams iron as ferric EDTA injected subcutaneously. | |
| 4 (about 18 hours later) | γ/l.. 900 |
| 40 milligrams iron as ferric EDTA injected subcutaneously. | |
| 5 (about 18 hours later) | γ/l.. 900 |
| 40 milligrams iron as ferric EDTA injected subcutaneously. | |
| 6 (about 18 hours later) | γ/l.. 1400 |

These results clearly show that the ferric EDTA salt has the ability to break through the so-called "milk barrier" and become available in the milk.

In still another experiment, nursing sows were injected intramuscularly with either monosodium ferric EDTA (10 cubic centimeters of a 10 percent solution), iron ammonium citrate or saline three days after farrowing and again at ten days. The two iron preparations contained equivalent amounts of iron. Hematocrits were obtained weekly. The results are expressed as the difference between the hematocrit percent three days post-farrowing and at the termination of the experiment three weeks post-farrowing. The litters of the sows injected with iron EDTA had more normal hematocrit percentages than did the litters of the sows injected with saline or ferric ammonium citrate. This would indicate the passage of iron through the milk in the iron EDTA groups.

TABLE II

*Iron administration through the milk for the treatment of piglet anemia*

| Treatment | No. Piglets | Pre-Inj. Hct., percent | Term Hct., percent | Difference Hct., percent |
|---|---|---|---|---|
| Saline | 10 | 33.8 | 28.2 | −5.6 |
| Fe EDTA | 9 | 31.8 | 30.7 | −1.1 |
| Fe Amm. C. T. | 10 | 33.9 | 26.9 | −7.0 |
| Fe EDTA | 11 | 26.4 | 25.4 | −1.0 |
| Saline | 8 | 31.1 | 22.7 | −8.4 |

I claim:

1. A method of preventing iron-deficiency anemia in suckling mammals which comprises the step of administering parenterally to the lactating mother an iron chelate of ethylenediamine tetraacetic acid during the suckling period.

2. A method of increasing the iron content of milk of lactating mammals which comprises introducing parenterally into the lactating mammal a quantity of an iron chelate of ethylenediamine tetraacetic acid.

3. A method of increasing the iron content of milk of lactating mammals which comprises introducing parenterally into the lactating mammal a quantity of an iron chelate of a chelating agent having a stronger iron-binding capacity than the iron-binding transferrin of the mammal's blood plasma.

4. A method of increasing the iron content of milk of lactating mammals which comprises the step of intramuscularly injecting into the lactating mammal a quantity of the ferric chelate of ethylenediamine tetraacetic acid.

5. A method of increasing the iron content of milk of lactating mammals which comprises the step of intramuscularly injecting into the lactating mammal a quantity of the ferrous chelate of ethylenediamine tetraacetic acid.

6. A method of increasing the iron content of milk of lactating mammals which comprises introducing parenterally into the lactating mammal from 1 to 200 milligrams of an iron chelate of ethylenediamine tetraacetic acid per kilogram of body weight.

7. A method in accordance with claim 6 in which the administration of the iron chelate is repeated at an interval of from 7 to 10 days.

8. A method of increasing the iron content of the milk of lactating sows which comprises intramuscularly injecting into said lactating sow from 1 to 200 milligrams of an iron chelate of ethylenediamine tetraacetic acid per kilogram of body weight.

9. The process in accordance with claim 8 in which the chelate is monosodium ferric ethylenediamine tetraacetate.

10. A method of preventing development of iron-deficiency anemia in suckling pigs which comprises the step of administering parenterally an iron chelate of ethylenediamine tetraacetic acid to the lactating mother sow after birth of said suckling pigs and repeating the administration of the iron chelate about 7 to 10 days thereafter.

References Cited in the file of this patent

UNITED STATES PATENTS 2,816,060 Carter ................ Dec. 10, 1957

OTHER REFERENCES

Physicians' Desk Reference (P.D.R.), 1957, p. 473.